United States Patent Office 3,585,030
Patented June 15, 1971

3,585,030
PROCESS FOR THE PRODUCTION OF COLOUR IMAGES BY POLYMERIZATION
Willibald Pelz, Opladen, Eberhard Günther, Leverkusen, and Hans-Dieter Meissner, Cologne-Buchheim, Germany, assignors to Agfa-Gevaert Aktiengesellschaft, Leverkusen, Germany
No Drawing. Filed Aug. 7, 1968, Ser. No. 750,771
Claims priority, application Germany, Aug. 16, 1967,
P 16 97 470.6
Int. Cl. G03c 5/54, 1/72, 1/76
U.S. Cl. 96—29            15 Claims

ABSTRACT OF THE DISCLOSURE

Colored images can be produced from a photographic material comprising at least one silver halide emulsion layer and containing diffusible dyes or precursors of dyes that contain groups rendering the dyes or precursors capable of polymerizing and thus becoming diffusion-fast under the influence of oxidation products of silver halide developing agents which oxidation products act as initiators for the polymerization.

---

The invention relates to an image recording material and a process using this material for the production of negative and positive colour images.

Processes and materials for the production of colour images using photo polymerizable systems are already known. However, they are either not sensitive enough to be used for taking original photographs, or they do not provide the possibility of producing polychromatic images.

It is the object of the invention to develop a polymerization process which works with recording materials which have the sensitivity to light of the known silver halide emulsions and also enable multicoloured positive images to be produced.

A process for the production of colour images has now been found in which a material is used which includes at least one silver halide emulsion layer which contains a diffusible dye or diffusible dye precursor. These dyes or precursors become diffusion fast in the exposed and developed areas but remain diffusible in the unexposed areas and can either be washed out or transferred to a receiving material.

The dyes or precusors being polymerizable because they contain groups which are capable of polymerizing under the influence of polymerization initiators. The development of the material is carried out with substances which reduce exposed silver halide to form oxidation products which in turn act as initiators to bring about polymerization of the diffusion-fast dyes or precursors.

The light sensitive layers which can be used for the process according to the invention contain the following components: (a) a light sensitive silver salt (AgCl, AgBr, AgI, mixed silver halides or other light sensitive silver salts) which can be sensitized in known manner for a particular region of the spectrum, (b) a polymerizable monomer which constitutes a dye or precursor of a dye and preferably contains 1 to 3 vinyl groups per molecule.

These compounds will now briefly be termed polymerizable dyes, (c) a natural or synthetic binder which is permeable to water, such as gelatine, other proteins such as albumin or casein, alginic acid or its derivatives such as its alkali metal salts, esters or amides, starch or its derivatives, carrageenates, polyvinyl alcohol, polyvinylpyrrolidone or acrylic acid polymer or methacrylic acid polymers or copolymers with derivatives such as esters or amides.

The light sensitive layers may also contain mono- or bifunctional, uncoloured copolymerizable monomers which are incorporated into the diffusible polymer in the course of the polymerization which is initiated by the oxidation products of the developer. These additional components correspond to the following formula:

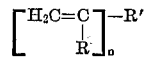

in which:

$n = 1-2$;

R = a hydrogen atom or an alkyl group with preferably up to 5 carbon atoms;

R' = saturated or unsaturated aliphatic groups with preferably up to 5 carbon atoms, aryl, in particular phenyl, which may carry further substituents such as alkyl (e.g. methyl) or halogen atoms such as chlorine or bromine; carboxyl or esterified carboxyl, in particular with short chained aliphatic alcohols, carbonamide or N-substituted, in particular alkylated carbonamide groups, nitrile, sulphone groups or ether groups with preferably up to 6 carbon atoms. These monomers may either be introduced into the layer in a water-soluble form or emulsified with the layer in the form of a solution in a solvent in known manner.

Furthermore, other polymers which contain other polymerizable groups capable of polymerizing with the dyes or precursors may be added to the layer, and these polymers may partly or entirely form the binder. The polymerizable dyes or precursors may react with these polymers by a graft polymerization. By choosing the proportions of polymerizable dyes to undyed mono or bifunctional copolymerizable monomers or graft-polymerizable polymers, the colour gradation of the positive or negative colour image obtained can be adjusted to the value required for the particular purpose for which the material is required.

The polymerizable monomers described under (b) may have many kinds of different chemical structures. They are characterised in that they contain a polymerizable radical which is linked to a dye molecule or a molecule of a precursor of the dye which is thus polymerizable. Especially suitable for use as the polymerizable unsaturated groups are acrylic acid or methacrylic acid or groups derived from these. These polymerizable dyes can be prepared in known and simple manner by reacting the dye or its precursor with an unsaturated vinyl compound, for example by reacting acrylic acid chloride with a dye which contains one amino group. Especially suitable are those dyes which contain amino groups or OH groups, e.g. the azo dyes. Furthermore, isocyanate groups may be introduced into the dye molecule and this molecule may then be linked to a vinyl group by reacting the isocyanate containing material with vinyl compounds which contains reactive hydrogen atoms. The choice of a suitable polymerizable dye can easily be determined by the expert by a few simple tests. The nature of the dye or its precursor depends on the type of colour image desired and the requirements of the particular process. The necessary properties of the polymerizable groups are determined by the structure of the light sensitive layer and especially by the nature of the developer, the oxidation products of which initiate the polymerization reaction after, development. Suitable combinations of polymerizable groups and developers can also be determined by simple tests.

The concentration of polymerizable dye in the layer may vary within wide limits according to the nature of the photographic process. Concentrations of between 0.005 and 0.05 mol per square meter of layer of 0.01 to 0.1 mol per mol of silver halide are generally sufficient.

Daylight, or simple incandescent lamps of about 100 watt positioned at a distance of 1 meter are generally sufficient for exposing the light sensitive layer. The exposure times under these conditions are about 0.01 to 1 second, and about 0.1 second is generally sufficient.

The developers may also have many different chemical structures. Compounds which reduce the exposed silver salt are themselves oxidized in the process into radical products of suitable activity and which are suitably long-lived are suitable. These radicals may serve as initiators for the polymerization of the polymerizable dyes, or for the copolymerization of any copolymerizable monomers that may have been added or of the graft polymerization with any polymers which contain unsaturated groups.

A few simple tests are again sufficient to determine the suitability of a particular compound for use as a developer. In principle, any inorganic or organic photographic developer after oxidation is suitable for initiating polymerization and therefore can be used for the process according to the invention.

Especially suitable are developer substances of the following formulae:

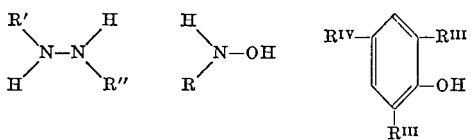

in which:
R=a hydrogen atom, an alkyl group with preferably up to 5 carbon atoms, or an aryl group, preferably phenyl;
R'=a hydrogen atom, an alkyl group with up to 5 carbon atoms, aryl group, preferably phenyl, a heterocyclic radical or an acyl group, preferably an acyl group which is derived from short chain aliphatic carboxylic acids having up to 5 carbon atoms or from simple phenyl carboxylic acids, such as benzoyl; the above substituents, in particular the phenyl rings, may contain further substituents, e.g. alkyl such as methyl or ethyl, halogen atoms such as chlorine or bromine, alkoxy group having preferably up to 3 C-atoms, amino etc.;
R''=R' or CO R' or $SO_2$ R';
$R^{III}$=a hydrogen atom or a short, preferably branched chain alkyl group having up to 5 carbon atoms;
$R^{IV}$=an alkyl group with preferably up to 5 carbon atoms.

These developer substances may be used not only alone but also in combination with each other. It was surprisingly found in this connection that if two or more different developer substances are used together, better results are obtained than with the individual substances. A synergistic effect occurs.

To produce negative colour images, the layers which have been prepared according to the invention and exposed are treated with solutions of these developers and the unpolymerized dye which is still diffusible is removed by washing.

The developed metallic silver is then bleached and removed by means of a silver halide solvent together with the undeveloped silver halide.

To produce positive colour images, the exposed layer is thoroughly moistened with developer solution while in close contact with a receiving layer. A positive colour image is then produced in this layer by diffusion of the polymerized dye from the unexposed areas into the receiving layer.

Receiving layers which are suitable for use are, for example, layers of gelatine or other water-permeable binders, such as those which can also be used for the light sensitive layer, applied to a baryta paper support.

The dyes which have been transferred into the receiving layer in those areas which correspond to the image then colour this layer correspondingly so that a positive image of the original is obtained.

According to another embodiment of the invention, the receiving layers may contain compounds such as peroxides which cause polymerization of the polymerizable dyes which have been transferred from the light sensitive layer. Furthermore, polymerizable monomers may be added to the receiving layer to form copolymers with the polymerizable dyes which have been transferred there. The receiving material may contain other additives or layers which serve, for example, for controlling the diffusion process or fixing the dye.

If the light sensitive layer does not contain polymerizable dyes but polymerizable precursors for dyes, compounds which will react with the precursors must be incorporated into the receiving layer. The precursors which have been transferred then react with these compounds to form the desired image dyes. Conversion of the precursors into dyes can also be effected by subsequently treating the receiving layer or the light sensitive layer in a suitable bath.

In a further embodiment of the process according to the invention, the developers may be added directly to the light sensitive layers. These only require to be treated during contact with the receiving layer with a bath which initiates the development. The components required for this may also be added to the receiving layer, from where they then diffuse into the light sensitive layer during contact.

EXAMPLE 1

5 g. of the polymerizable red dye of the following formula

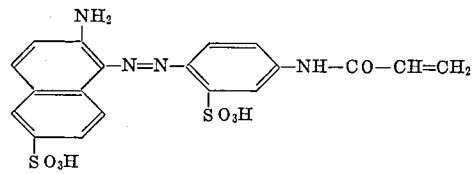

together with 6 g. of gelatine are dissolved in 50 ml. of water, and the solution is added to 100 g. of a highly sensitive silver iodobromide emulsion which contains 50 g. of silver halide and 60 g. of gelatine per kg.

This mixture is applied to a cellulose triacetate support at 35° C., dried, and exposed for 0.02 second with a 100 watt incandescent lamp at a distance of 1 m. under a grey wedge. It is then treated with the following developer:

0.05 mol o-ethoxy-phenylhydrazine,
0.01 mol $Na_2SO_3$,
0.01 mol KBr and
0.01 mol NaOH.
made up to 1000 ml. with water.

After development, further reaction is stopped by placing in a 1% aqueous acetic acid solution and the developed silver and the remaining silver halide is then removed with a bleach fixing bath of the following composition:

3.78 g. of ethylenediaminotetracetic acid,
14 g. of its sodium salt and
40 g. of its iron-(III)-complex and
10 g. $Na_2SO_3$,
200 g. $Na_2S_2O_3$,
1 ml. of syntharesin oil and
1.5 g. of thiosemicarbazide
made up to 1 litre with water.

The dye which is not polymerized is washed out. An intensely red negative is obtained. Instead of o-ethoxyphenylhydrazine, the equivalent quantity of β-N-methanesulphonyl-o-ethoxyphenylhydrazine may be used.

EXAMPLE 2

5 g. of a photopolymerizable monomer of the formula

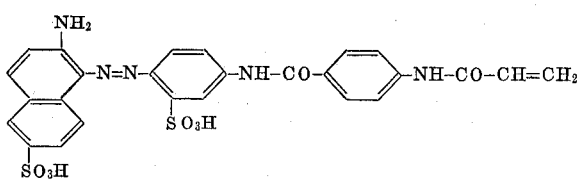

with 6 g. of gelatine and 5 g. of N,N' methylene-bis-acrylamide are dissolved in 50 ml. of water, 100 g. of an emulsion, as used in Example 1, is added, and the mixture is poured onto a layer support. After exposure, the film is developed as in Example 1 in a solution containing 0.1 mol per litre of 2,6-di-tertiary butyl-4-methylphenol and 0.01 mol per litre of NaOH in a mixture of water, ethanol and dimethylformamide (ratio 1:3:1) and then treated further as in Example 1. A red negative image is obtained.

EXAMPLE 3

3 g. of N-phenyl-N'-acetyl-hydrazine together with 6 g. of gelatine are dissolved in 50 ml. of water and added to 100 g. of an emulsion as in Example 1. 10 g. of a bifunctional photopolymerizable monomer of the formula:

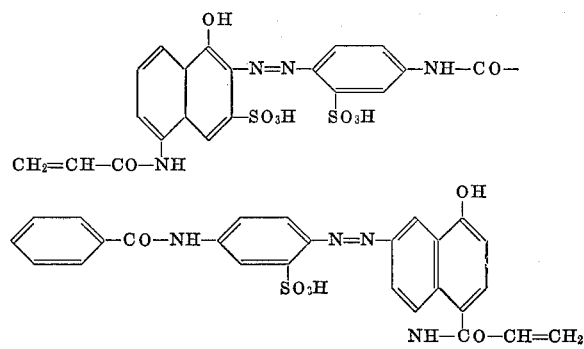

with 5 g. of acrylic acid amide are dissolved in 50 ml. of a mixture of water and methanol (1:1), and this solution is stirred into the emulsion which is then poured on a layer support of baryta paper. After drying, the layer is exposed and brought into contact with a sheet of baryta paper coated with a gelatine layer, and the two layers are moistened with 0.01 N NaOH. When the two layers are pulled apart, an orange coloured positive image is obtained on the image receiving layer.

EXAMPLE 4

1 g. of hydrazine hydrogen sulphate and 1 g. of hydroxyl ammonium sulphate are dissolved in 40 ml. of water and the solution is adjusted to pH 5.5 by the addition of NaOH. 1 g. of a coloured polymerizable monomer of the formula

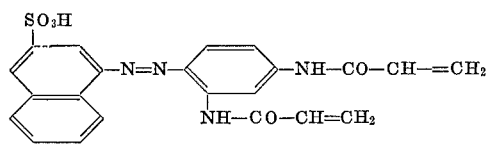

is then added to the solution, and the mixture is added to 70 g. of a silver halide emulsion which contains 35 g. of silver bromide and 60 g. of gelatine per kg. The emulsion is applied to a layer support of baryta paper.

After drying, the layer is exposed as in Example 1 and then brought into contact with a sheet of baryta paper coated with a gelatine layer which is moistened with 0.1 N NaOH. When the two layers are pulled apart, a yellow positive image is obtained on the receiving layer.

EXAMPLE 5

1.5 g. of N - (2-ethoxyphenyl) - N' - methylsulfonylhydrazine are dissolved in 40 ml. of water and the solution is adjusted to pH 5.5 by the addition of NaOH. 1 g. of a coloured polymerizable monomer of the formula

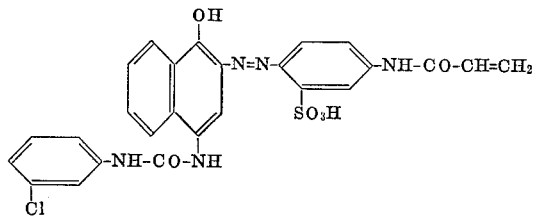

is then added to the solution, and the mixture is added to 70 g. of a silver halide emulsion which contains 35 g. of silver bromide and 60 g. of gelatine per kg. The emulsion is applied to a layer support of baryta paper.

After drying, the layer is exposed as in Example 1 and then brought into contact with a sheet of baryta paper coated with a gelatine layer which is moistened with 0.1 N NaOH. When the two layers are pulled apart, a purple positive image is obtained on the receiving layer.

EXAMPLE 6

Preparation and processing of the materials correspond with Example 5. As developer 2-hydrazinobenzthiazole is used together with the coloured polymerizable monomer of the following formula

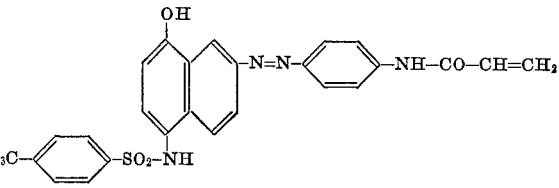

On the image receiving layer a purple positive image is obtained.

We claim:
1. In the process for producing a color image in a photographic layer containing at least one silver halide emulsion layer containing an effective amount of a dye or a precursor of a dye that reacts with the oxidation products of a photographic developer during development to become diffusion fast in the exposed and developed area and remains diffusible in the unexposed area, the improvement according to which the dye or precursor of a dye comprises a polymerizable monomer, said monomer being polymerizable under the influence of the oxidation products of a photographic developer and the development is carried out with substances which reduce the exposed silver halide to form oxidation products which act as initiators to bring about the polymerization of said polymerizable monomer.

2. A process according to claim 1, characterized in that the polymerizable dye used is a dye molecule which contains preferably 1 to 3 vinyl groups which may be further substituted and which are linked to the dye or precursor product of dye via a

bond.

3. A process according to claim 1 characterized in that the developers used are compounds of the following formulae:

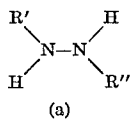 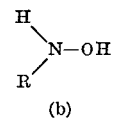 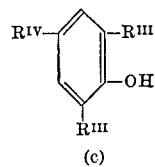
(a)　　　　　(b)　　　　　(c)

in which:
- R = a hydrogen atom or an alkyl or aryl group;
- R' = a hydrogen atom, an alkyl group with up to 5 carbon atoms, an aryl, heterocyclic or acyl group;
- R'' = R' or COR' or $SO_2R'$;
- R''' = a hydrogen atom or a short chain alkyl group with up to 5 carbon atoms;
- $R^{IV}$ = an alkyl group.

4. A process according to claim 3, characterized in that derivatives of phenyl hydrazine are used as developers.

5. A process according to claim 4, characterized in that o-ethoxyphenylhydrazine is used as a developer.

6. A process according to claim 3, characterized in that N-phenyl-N'-acetylhydrazine is used as a developer.

7. A process according to claim 3, characterized in that a mixture of developers of the Formulae a and b is used.

8. A process according to claim 1, characterized in that the developers are added to the light sensitive layer.

9. In a photographic material for producing a color image having a photographic layer containing an effective amount of a dye or a precursor of a dye that reacts with the oxidation products of a photographic developer during development to become diffusion fast in the exposed and developed area and remains diffusible in the unexposed area, the improvement according to which the dye or precursor of a dye comprises a polymerizable monomer, said monomer being polymerizable under the influence of the oxidation products of a photographic developer and the photographic developer reduces the exposed silver halide to form oxidation products which act as initiators to bring about the polymerization of said polymerizable monomer.

10. Photographic material according to claim 9, characterized in that the polymerizable dye used is an azo dye which contains at least one acryloyl group.

11. Photographic material according to claim 9, characterized in that the light sensitive layer in addition contains developers of the following formulae:

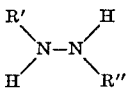 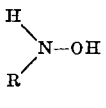 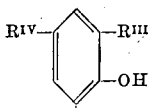
(a)　　　　　(b)　　　　　(c)

in which:
- R = a hydrogen atom or an alkyl or aryl group;
- R' = a hydrogen atom or an alkyl group with up to 5 carbon atoms, an aryl heterocyclic or acyl group;
- R'' = R' or COR' or $SO_2R'$;
- R''' = a hydrogen atom or a short chain alkyl group with up to 5 carbon atoms;
- $R^{IV}$ = an alkyl group.

12. Photographic material according to claim 9, characterized in that it contains as developers derivatives of phenyl hydrazine.

13. Photographic material according to claim 9, characterized in that it contains as developer o-ethoxyphenylhydrazine.

14. Photographic material according to claim 9, characterized in that it contains as a developer N-phenyl-N-acetylhydrazine.

15. Photographic material according to claim 11, characterized in that it contains a mixture of developers of the Formulae a and b.

References Cited

UNITED STATES PATENTS 3,244,519　4/1966　Schwerin _____ 96—28X

NORMAN G. TORCHIN, Primary Examiner
A. T. SURO PICO, Assistant Examiner

U.S. Cl. X.R.
96—72, 114

PO-1050
(5/69)

UNITED STATES PATENT OFFICE
CERTIFICATE OF CORRECTION

Patent No. 3,585,030          Dated June 15, 1971

Inventor(s) Willibald Pelz et al

It is certified that error appears in the above-identified patent and that said Letters Patent are hereby corrected as shown below:

Column 3, line 66, "polymerized" should read -- unpolymerized -- .

Signed and sealed this 25th day of January 1972.

(SEAL)
Attest:

EDWARD M. FLETCHER, JR.          ROBERT GOTTSCHALK
Attesting Officer                 Commissioner of Patents